US008850581B2

(12) United States Patent
Wang et al.

(10) Patent No.: US 8,850,581 B2
(45) Date of Patent: Sep. 30, 2014

(54) IDENTIFICATION OF MALWARE DETECTION SIGNATURE CANDIDATE CODE

(71) Applicant: Microsoft Corporation, Redmond, WA (US)

(72) Inventors: Xun Wang, Sammamish, WA (US); Hong Jia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 91 days.

(21) Appl. No.: 13/670,529

(22) Filed: Nov. 7, 2012

(65) Prior Publication Data

US 2014/0130158 A1    May 8, 2014

(51) Int. Cl.
G06F 11/00 (2006.01)
G06F 12/14 (2006.01)
G06F 12/16 (2006.01)
G08B 23/00 (2006.01)

(52) U.S. Cl.
USPC .......................................................... 726/23

(58) Field of Classification Search
USPC ..................................... 726/22–25
See application file for complete search history.

(56) References Cited

U.S. PATENT DOCUMENTS

| | | | | |
|---|---|---|---|---|
| 5,440,723 | A * | 8/1995 | Arnold et al. ....................... | 714/2 |
| 5,842,002 | A | 11/1998 | Schnurer et al. | |
| 7,058,822 | B2 | 6/2006 | Edery et al. | |
| 8,046,834 | B2 * | 10/2011 | Flynn et al. ....................... | 726/24 |
| 8,353,040 | B2 * | 1/2013 | Tahan et al. ....................... | 726/24 |
| 8,656,496 | B2 * | 2/2014 | Artzi et al. ....................... | 726/25 |
| 2002/0056076 | A1 | 5/2002 | Made | |
| 2011/0185427 | A1 * | 7/2011 | Aciicmez et al. ................ | 726/24 |
| 2012/0072988 | A1 * | 3/2012 | Agrawal ........................... | 726/24 |
| 2013/0014257 | A1 * | 1/2013 | Duftler et al. .................... | 726/23 |
| 2013/0340076 | A1 * | 12/2013 | Cecchetti et al. ............... | 726/23 |

OTHER PUBLICATIONS

Dynamic Taint Analysis for Automatic Detection, Analysis, and Signature Generation of Exploits on Commodity Software 2005 James Newsome Dawn Song.*
Taint checking From Wikipedia, the free encyclopedia (as crawled by Wayback Machine on Jan. 14, 2012).*
Static Analysis of Executables to Detect Malicious Patterns Mihai Christodorescu Somesh Jha Proceedings of the 12th USENIX Security Symposium Aug. 4-8, 2003.*

(Continued)

*Primary Examiner* — Andrew Nalven
*Assistant Examiner* — Vadim Savenkov
(74) *Attorney, Agent, or Firm* — Henry Gabryjelski; Kate Drakos; Micky Minhas

(57) ABSTRACT

A region of HTML or PDF file bytecode run on a virtual machine is identified as possible malware, allowing a detection signature to be generated. A determination is made, based on code behavior, that malware may be present. Variables visible in this identification start state can be found by mapping the start state to scopes in an abstract syntax data structure. Searching previously executed states of the virtual machine for any assignment of a variable that belongs to the set of variables of interest provides a set of assignments of interest, even in obfuscated code. Nonterminated assignments of interest will lead in turn to other variables of interest and assignments of interest, until all assignments of interest are terminated. At that point, a region of code defined by the assignments of interest is identified as a malware detection signature generation candidate, and submitted to a human or automated analyst.

20 Claims, 3 Drawing Sheets

(56) References Cited

OTHER PUBLICATIONS

Control Flow Graphs as Malware Signatures Guillaume Bonfante, Matthieu Kaczmarek, and Jean-Yves Marion International Workshop on the Theory of Computer Viruses (2007).*

Curtsinger, et al., "ZOZZLE: Fast and Precise In-Browser JavaScript Malware Detection", Retrieved at <<http://static.usenix.org/events/sec11/tech/full_papers/Curtsinger.pdf>>, 20th USENIX Security Symposium, Aug. 10, 2011, pp. 16.

Cova, et al., "Detection and Analysis of Drive-by-Download Attacks and Malicious JavaScript Code", Retrieved at <<http://www.cs.ucsb.edu/~vigna/publications/2010_cova_kruegel_vigna_Wepawet.pdf>>, ACM proceedings of 19th international conference on World wide web, Apr. 26, 2010, pp. 10.

Laskov, et al., "Static Detection of Malicious JavaScript-Bearing PDF Documents", Retrieved at <<https://www.acsac.org/2011/openconf/modules/request.php?module=oc_program&action=view.php&a=&id=125&type=2&OPENCONF=54jm3hh7laelc19qq6ernql5m2>>, ACM proceedings of 27th Annual Computer Security Applications Conference (ACSAC), Dec. 5, 2011, pp. 10.

Schütt, et al., "Early Detection of Malicious Behavior in JavaScript Code", Retrieved at <<http://filepool.informatik.uni-goettingen.de/publication/sec/2012b-aisec.pdf>>, ACM Workshop on Artificial Intelligence and Security (AISEC), Retrieved Date: Sep. 11, 2012, pp. 9.

Tzermias, et al., "Combining Static and Dynamic Analysis for the Detection of Malicious Documents", Retrieved at <<http://dcs.ics.forth.gr/Activities/papers/mdscan.eurosec11.pdf>>, ACM Proceedings of the Fourth European Workshop on System Security (EUROSEC), Apr. 10, 2011, pp. 6.

"Abstract syntax tree", Retrieved at <<http://en.wikipedia.org/wiki/Abstract_syntax_tree>>, Aug. 13, 2012, pp. 3.

"Antivirus software", Retrieved at <<http://en.wikipedia.org/wiki/Antivirus_software#Signature-based_detection>>, Sep. 28, 2012, pp. 10.

"Bytecode", Retrieved at <<http://en.wikipedia.org/wiki/Bytecode>>, Aug. 1, 2012, pp. 3.

"jsunpack—a generic JavaScript unpacker", Retrieved at <<http://jsunpack.jeek.org/>>, no later than Sep. 26, 2012, pp. 2.

"jsunpack blog", Retrieved at <<http://jsunpack.blogspot.com/>>, Jul. 2, 2010 through Oct. 3, 2011, pp. 6.

"jsunpack-n—A generic JavaScript unpacker", Retrieved at <<http://code.google.com/p/jsunpack-n/>>, no later than Sep. 13, 2012, pp. 1.

"Malzilla—malware hunting tool", Retrieved at <<http://malzilla.sourceforge.net/>>, Jul. 9, 2007 through Feb. 11, 2008, pp. 3.

"Wepawet", Retrieved at <<http://wepawet.iseclab.org/about.php>>, copyright date 2008-2012, pp. 2.

* cited by examiner

IDENTIFICATION OF MALWARE DETECTION SIGNATURE CANDIDATE CODE

BACKGROUND

Malware such as viruses can be detected in various ways, such as by using heuristics to spot potentially malicious activities, by analyzing software behavior logged while running the software in an emulation, in a "sandbox," and/or in another segregated environment, and by comparing software content to a dictionary of known malware signatures. Although malware detection tools continually improve, malware developers also continue to devise new malware variations and new mechanisms for planting malware in computer systems. For example, in addition to embedding malware in application executable code files, some perpetrators now embed malware in HTML files, in PDF files, and in other files that contain user-generated and/or server-generated content. In particular, files may contain obfuscated malware that is implemented in JavaScript® code (mark of Oracle America, Inc.), in other interpreted code, and/or in other languages which utilize bytecode.

SUMMARY

Some embodiments described in this document are directed at the technical problem of malware detection generally, and some are directed in particular at the technical challenge of identifying code which characterizes malware sufficiently well to be helpful in generating a malware detection signature for use in an antivirus engine. To aid malware detection, some embodiments described here include an execution environment that is configured to safely and efficiently run target software that might have malware embedded in HTML and PDF files. This allows a reasoned determination to be made that a portion of the software should be more closely investigated, and perhaps even be used to generate a malware detection signature. Other embodiments are compatible with such an execution environment and with such determinations, but do not themselves include both the execution environment and a mechanism for making the investigation determination.

For example, some embodiments provide tools and techniques for identifying a specific region of a target software program code as a malware detection signature generation candidate, i.e., a candidate for use in generating a malware detection signature. The region may be a set of contiguous source code statements, for example, or it may include both contiguous and non-contiguous statements, or consist of non-contiguous statements. The region may include source code, lower-level code such as bytecode, or both.

The target software program is configured to run on a virtual machine. One embodiment computationally receives an identification start state in a computer memory such as RAM or a hard disk. The start state is a state of the virtual machine while the program was running, and in particular is a state of the virtual machine for which a determination is made or was made (automatically or manually) that the program code should be investigated as a possible carrier or form of malware.

This embodiment places in a set of variables of interest in the memory at least one variable which is visible in the identification start state, namely, a variable which is within scope and could be assigned a value. The embodiment may find such a visible variable by mapping the identification start state to an abstract syntax data structure representation of the software program code that is being examined for malware; scopes are logged into the abstract syntax data structure by instrumentation code during compilation of the software program code. The embodiment searches previously executed states of the virtual machine for any assignment of a variable that belongs to the set of variables of interest, and puts into a set of assignments of interest in the memory an assignment that was found by the searching step.

This embodiment checks assignments of interest to see whether they are terminated, that is, whether the assigned value is fully determined without recourse to any variables that have not yet been placed in the set of variables of interest. When the set of assignments of interest contains a nonterminated assignment having at least one source parameter variable not found in the set of variables of interest, the embodiment places the source parameter variable(s) of that nonterminated assignment in the set of variables of interest and then repeats the searching and putting steps.

As a result, at some point this embodiment's set of assignments of interest will not contain any nonterminated assignment. When that occurs, the embodiment identifies as the malware detection signature generation candidate a region of code which is defined by the set of assignments of interest. The defined region may include the set of assignments of interest alone, or it may include the assignments of interest together with at least some of the other program code, depending on the user's expressed wishes and/or the particular embodiment's capabilities.

Some embodiments obtain the software program code at least in part by parsing an input file which contains the software program code. In particular, HTML files or PDF files may be parsed to obtain code in some embodiments. The organizational structures of such files and the techniques for locating code within them are familiar to those of skill.

Sometimes the determination to investigate further is made by a human analyst, whereas some embodiments make the determination themselves that the program code should be investigated, e.g., by analyzing information which is logged while the program code runs. For example, program behavior may be automatically compared to a list of suspicious behaviors, using familiar information and techniques.

From an analyst's perspective, some embodiments help a malware detection/prevention analyst identify software program code for potential use in generating a malware detection signature. In one embodiment, the analyst utilizes at least one processor and a computer-readable memory to run the program code on a virtual machine which changes states while the program code is running. In some embodiments, the analyst causes the computational machine to parse an input HTML file or a PDF file to obtain the software program code.

The analyst makes a determination that the program code should be investigated as a possible carrier of malware, from at least one result which corresponds to at least one state of the virtual machine while running the program code. Any familiar tool or criteria for treating software as suspicious can be used to support the determination. An identification start state of the virtual machine is associated in the memory with the determination; the suspicious behavior, for example, will have occurred during the identification start state or during an earlier state of the virtual machine while the program was running.

A computational machine used by the analyst to obtain candidate code may be the same machine that runs/ran the virtual machine, or it may be another machine. The analyst causes the computational machine to place in a set of variables of interest in a memory of the computational machine at least one variable which is visible in the identification start state, namely, a variable which is within scope and could be assigned a value. The analyst may control the computational machine through a script, a user interface, or another mechanism which causes the machine to execute code that places variables in the set of variables of interest. The analyst likewise causes the computational machine to search previously executed states of the virtual machine (states prior to the identification start state) for any assignment of a variable that belongs to the set of variables of interest, and to put into a set of assignments of interest in the memory an assignment that was found by the searching step.

In this embodiment, when the set of assignments of interest contains a nonterminated assignment having at least one source parameter variable, the computational machine is caused to place the source parameter variable(s) of that nonterminated assignment in the set of variables of interest and then repeat the searching and putting steps. After the set of assignments of interest does not contain a nonterminated assignment having at least one source parameter variable, the computational machine is caused to produce an identification of a region of code as the malware detection signature generation candidate, with the region of code being defined by the set of assignments of interest. The analyst receives the malware detection signature generation candidate identification which was produced by the computational machine, in the form of data displayed on a screen or printed in a file or a hard copy, for example.

In some embodiments, the analyst causes the computational machine to perform the step of finding a variable which is visible in the identification start state based on a mapping between the identification start state and an abstract syntax data structure representation of the software program code. In some, instrumentation code logs scopes in the abstract syntax data structure as code of the target software program is generated during a compilation.

The region of code identified by the computational machine and then received by the analyst can be defined in various ways, depending on analyst commands, machine settings, and the particular capabilities of an embodiment. For example, the identified region may be the set of assignments of interest together with at least code for whatever function each assignment is contained in. Or the region may be the set of assignments of interest together with a specified number of lines of code before (and/or after) the assignment.

From an architectural perspective, some embodiments include a logical processor and a memory in operable communication with the logical processor. An abstract syntax data structure representation of a target software program code resides in the memory. The target software program code (namely, the code being checked for malware) may include bytecode. In some but not necessarily all cases the target software includes JavaScript® code (mark of Oracle America, Inc.).

A start state of a virtual machine also resides in the memory, with the start state being a state of the virtual machine during a run of the software program code on the virtual machine. A signature candidate generator includes code which upon execution by the logical processor will utilize the abstract syntax data structure representation and the virtual machine start state to identify a set of assignments of interest. The assignments of interest include at least one assignment in the software program code that is visible to at least one variable of the start state. The assignment is not simply swept in along with other code, but is included instead on the basis of the visibility. Without its visibility to a variable of interest the assignment would not necessarily have been included in the set of assignments of interest (although it might be brought in by its nearness to another assignment of interest), and because of that visibility, it is included.

Variations are possible. Some embodiments include parser code which upon execution by the logical processor will parse an input HTML file or a PDF file which contains the software program code. In some embodiments, the signature candidate generator includes code which upon execution by the logical processor will determine whether an assignment of interest is a terminated assignment. Some embodiments include a file type recognizer which upon execution will distinguish HTML files from PDF files. In some embodiments, a human-readable listing of an identified region of the software program code is present, with the identified region defined by the set of assignments of interest and also being less than the entire software program code (signature generation is thus focused on more relevant code). In some embodiments, a malware detection signature is present, the signature having been generated from a region of the software program code that is defined by the set of assignments of interest and is also less than the entire software program code.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
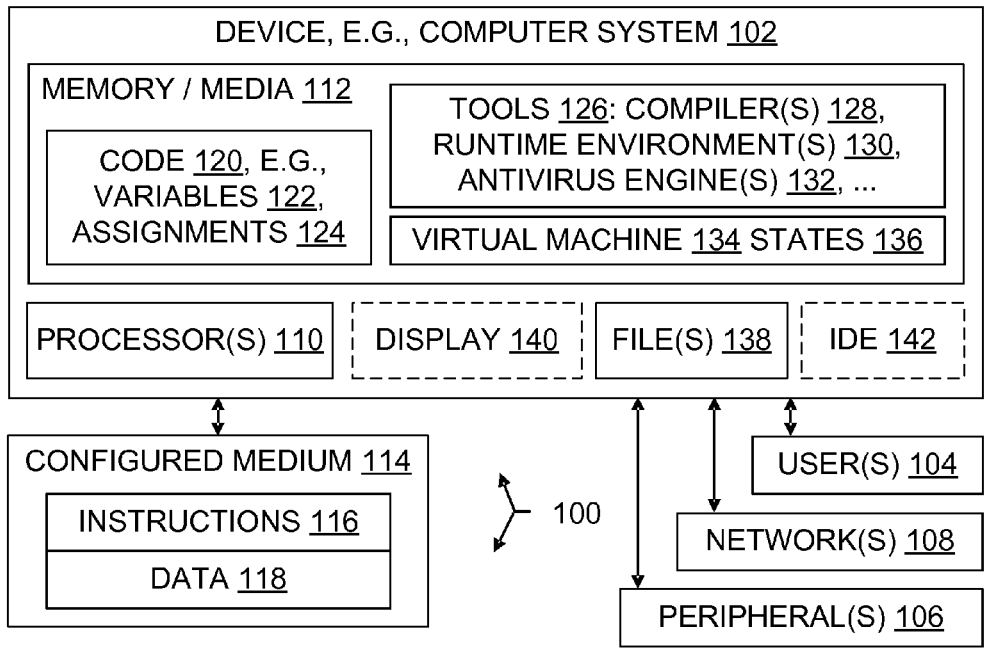
FIG. 1 is a block diagram illustrating a computer system having at least one processor, at least one memory, at least one source of code which might be infected by malware, and other items in an operating environment which may be present on multiple network nodes, and also illustrating configured storage medium embodiments.

To help analysts detect malware, some embodiments described here include or use an execution environment that is configured to safely and efficiently run target software that might have malware embedded in HTML and PDF files. This allows a reasoned determination to be made that a portion of the software should be more closely investigated, and perhaps even be used to generate a malware detection signature, even when the malware is obfuscated. Some embodiments focus further on tools and techniques for identifying code that may be used to characterize malware by serving as the basis of a malware detection signature. By focusing attention on a particular subset of a target program which is more likely than other portions to contain malware, such embodiments save analysts time and effort.

Some embodiments described herein may be viewed in a broader context. For instance, concepts such as virtual machine states, abstract syntax data structures, assignments, variables, visibility, malware, and searching may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems related to malware detection. Other media, systems, and methods involving virtual machine states, abstract syntax data structures, assignments, variables, visibility, malware, and/or searching are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems of malware detection. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein locate variables of interest based on scope, locate assignments of interest based on variables of interest, search previously executed states of a virtual machine, and/or map an identification start state to an abstract syntax data structure representation of a software program code that is being examined for malware. Third, technical effects provided by some embodiments include a distinction between file types, and code extracted from files based on that file type distinction and on file-type-specific parsing. Fourth, some embodiments include a technical adaptation in the form of an abstract syntax data structure instrumented with scopes. Fifth, some embodiments modify technical functionality of an execution environment by identifying malware detection signature candidate code based on technical considerations such as whether an assignment is terminated and whether a variable is in scope. Sixth, technical advantages of some embodiments include a lower error rate and simplified analyst effort in selecting code to be used in generating malware detection signatures. Seventh, some embodiments apply concrete technical means such as a file type recognizer, parser, virtual machine state search functionality, and scope information to obtain particular technical effects such as a set of assignments of interest directed to the specific technical problem(s) of selecting code to use when generating malware detection signatures, thereby providing a concrete and useful technical solution.

Some embodiments described herein provide tools and techniques for parsing HTML and PDF files and building up a runtime environment that is specially designed to target software by running JavaScript® malware safely inside the environment (mark of Oracle America, Inc.). In some, the configuration of the emulated environment is easy to change for different malware. In some, the environment contains various checkpoints for observing different aspects of input and output resources while running malware. Some embodiments simulate external plugins or objects that may interact with the malware, such as ActiveX® components (mark of Microsoft Corporation).

Some embodiments facilitate a determination of JavaScript® malware based on logged runtime input/output information. Some locate a code region which has statements that trigger the maliciousness determination by using deep instrumentation which links and analyzes both the state of a JavaScript® virtual machine and input abstract syntax from a JavaScript® compiler (JavaScript® is a mark of Oracle America, Inc.). In some embodiments, a system architecture works as a whole to identify malicious code region statements, to assist an automated or human analyst generate generic signatures for antivirus engines which provide better detection and protection than other signatures.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments described herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term of the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Likewise, the calculations required to locate assignments of interest, for example, cannot as a practical matter be formed by mere mental steps or with paper and pencil, both because of the speed needed to perform these complex calculations and because underlying data such as virtual machine states are normally in computer-readable form, not human-readable form.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "variable(s)" means "one or more variables" or equivalently "at least one variable".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, analyzing, assigning, associating, causing, changing, containing, defining, determining, distinguishing, executing, finding, generating, having, identifying, including, investigating, listing, logging, making, mapping, parsing, placing, putting, receiving, recognizing, repeating, residing, running, searching, specifying, utilizing (or adds, added, analyzes, analyzed, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable medium is not a propagating signal or a carrier wave outside the scope of patentable subject matter under United States Patent and Trademark Office (USPTO) interpretation of the In re Nuijten case unless explicitly and expressly stated otherwise in the claim.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionally described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may grouped into interacting functional modules based on their inputs, outputs, and/or their technical effects, for example.

In the illustrated environments 100, one or more applications, utilities, or other software programs have code 120, which includes variables 122, assignments 124, functions, threads, and other components which are generally familiar in the art. Some of the code may be obfuscated. Tools 126 for software development and/or software usage include familiar items such as compilers 128 and other code generators, runtime environments 130, and antivirus engines 132.

The code 120 may execute on a virtual machine 134, changing state 136 information (variables, instruction pointers, stack content, etc.) as it executes. Code 120 and tools 126 are often stored in files 138. The code 120, tools 126, and other items shown in the Figures and/or discussed in the text, may each reside partially or entirely within one or more hardware media 112, thereby configuring those media.

In addition to processors 110 (CPUs, ALUs, FPUs, and/or GPUs), memory/storage media 112, display(s) 140, and battery(ies), an operating environment may also include other hardware, such as buses, power supplies, wired and wireless network interface cards, and accelerators, for instance. CPUs are central processing units, ALUs are arithmetic and logic units, FPUs are floating point processing units, and GPUs are graphical processing units.

A given operating environment 100 may include an Integrated Development Environment (IDE) 142 which provides a developer with a set of coordinated software development tools 126 such as compilers, source code editors, profilers, debuggers, runtime environments, and so on. In particular, some of the suitable operating environments for some embodiments include or help create a Microsoft® Visual Studio® development environment (marks of Microsoft Corporation) configured to support program development. Some suitable operating environments include Java® and/or JavaScript® environments (marks of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
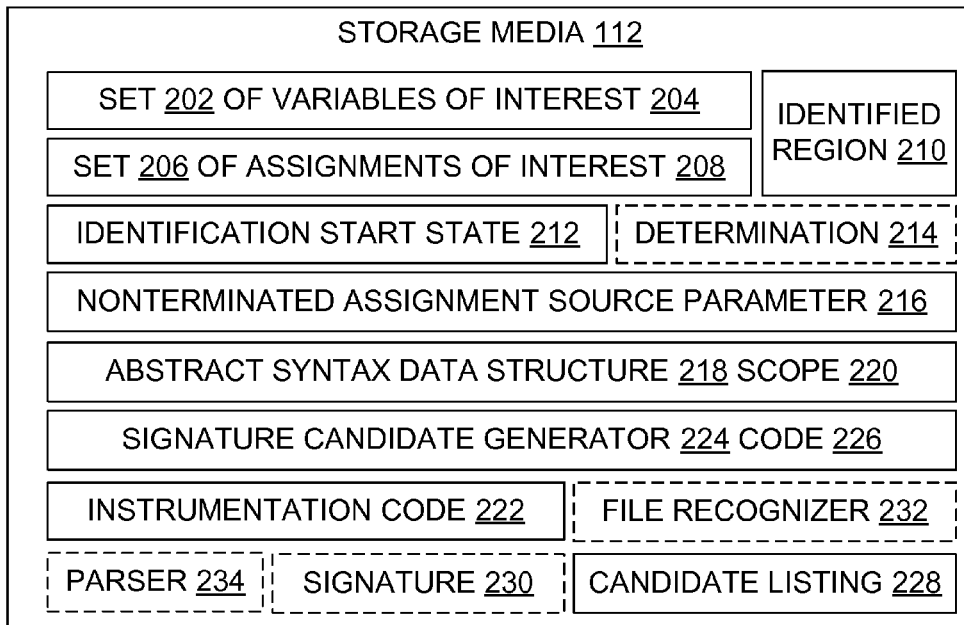
FIG. 2 is a block diagram illustrating aspects of malware detection signature candidate code region identification in an example architecture.

FIG. 2 illustrates aspects of a technical architecture which is suitable for use with some embodiments. A set 202 of variables of interest 204 and a set 206 of assignments of interest 208 reside in (and thus durably and physically configure) a storage medium 112. In general, the variables of interest 204 will be a proper subset of the variables 122 of a target program 120 which is being checked for malware, and the assignments of interest 208 will likewise be a proper subset of all the assignments 124 of the target program. The sets 202, 206, may each be implemented using a list, array, or other data structure. Variables 204 may be specified by way of their names, symbol table index, or address, for example, and assignments 208 may be specified by way of a file name, module name, line number, or instruction pointer, for example. The variables of interest 204 are used in some embodiments to identify the assignments of interest 208, which are used in turn to identify a region 210 of target program code as a malware signature candidate.

In the illustrated architecture, an identification start state 212 is a virtual machine 134 state 136 for which a determination 214 has been made that the target program should be investigated more closely. In particular, a determination is made that a portion of the code 120 that is active at the start state 212 will be extracted for closer scrutiny, and for possible use in malware signature 230 generation as code that is characteristic of a particular instance of malware. Note that the start state 212 marks the start for purposes of the code extraction, which is not necessarily (and typically is not) the start of the target program's execution on the virtual machine. Extraction of code for closer scrutiny is performed in some embodiments by code 226 within a signature candidate generator 224 component. Extracted code may be presented as a code listing 228 or by displaying/printing source code line numbers, for example.

The illustrated architecture also includes one or more nonterminated assignment source parameters 216. In general, any assignment 124 includes an expression that contains one or more source parameters. To execute an assignment, the source parameters are evaluated, the expression containing the source parameters is evaluated, and the value of the expression is assigned to a variable 122. This observation also applies to the assignments 124, 208 in the set 206 of assignments of interest.

As a simple example, consider an assignment "x<-1+3" (which may be represented using different syntax in various programming languages). In this assignment, the variable x is assigned the value of the expression "1+3" and the source parameters include constant values 1 and 3. As another example, in an assignment "y<-z-37.2" the variable y is assigned the value of the expression "z-37.2" and the source parameters include the variable z and the constant 37.2. The first assignment above (to x) is said to be terminated, because the value of all the source parameters is known without recourse to other statements. The second assignment (to y) is said to be nonterminated, because the value of all the source parameters is not known without recourse to other statements; the value of z is not determinable by recourse to the second assignment alone but is instead based on other statements. In some embodiments, a subexpression may serve as a source parameter. Other examples of source parameters are variables and function calls.

The illustrated architecture also includes an abstract syntax data structure 218, such as an abstract syntax tree produced by a compiler, for example. Abstract syntax data structures are generalizations of program code in which syntax has been reduced or removed. For instance, the C language assignment statement "prev=0;" and the FORTRAN language assignment statement "PREV=0" could well both have the same representation within an abstract syntax data structure. The illustrated abstract syntax data structure 218 has been enhanced (if necessary) to include variable scopes 220, which are used as explained elsewhere herein to locate assignment statements that are capable (at least as far as visibility is concerned) of assigning a value to a variable of interest 204. The scopes 220 may be added to and kept current in the abstract syntax data structure 218 by instrumentation code 222.

In some embodiments, a file recognizer 232 recognizes different file types, e.g., HTML, PDF, XML, DOC, DOCX, XCL, using familiar mechanisms such as file extensions and file headers. In some embodiments, a parser 234 parses a recognized file type in order to obtain target code 120 from a file 138 so the target code can be examined for malware. Familiar parsing tools and techniques can be used.

With reference to FIGS. 1 and 2, some embodiments provide a computer system 102 with at least one logical processor 110 and a memory medium 112 configured by circuitry, firmware, and/or software to identify candidate code for malware detection signature generation as described herein. The memory 112 is in operable communication with the logical processor(s) 110.

In some embodiments, an abstract syntax data structure 218 representation of a target software program code 120 resides in the memory 112. The target software program code (namely, the code being checked for malware) may include bytecode. In some but not necessarily all cases the target software includes JavaScript® code (mark of Oracle America, Inc.).

In some embodiments, a start state 136 of a virtual machine 134 also resides in the memory 112, with the start state being a state of the virtual machine during a run of the software program code 120 on the virtual machine. A signature candidate generator 224 includes code 226 which upon execution by the logical processor 110 will utilize the abstract syntax data structure 218 representation and the virtual machine start state 136 to identify a set 206 of assignments of interest 208. The assignments of interest 208 include at least one assignment 124 in the software program code that is visible to at least one variable 122 of the start state 136. The assignment 124 is not simply swept into this investigative focus along with other code 120, but is included instead on the basis of the visibility. Without its visibility to a variable of interest 204 the assignment 124 would not necessarily have been included in the set of assignments of interest 208, although it might be brought in by its nearness to another assignment of interest when the identified region 210 includes more than the assignments of interest per se. In other words, the assignment 124 becomes an assignment of interest 208 because at least one variable of interest 204 is visible to the assignment.

Some embodiments include parser code 234 which upon execution by the logical processor 110 will parse an input HTML file or a PDF file which contains the target software program code. Syntactic analysis, tokenization, finite state machines, syntax trees, and other familiar parsing tools can be used.

In some embodiments, the signature candidate generator 224 includes code 226 which upon execution by the logical processor 110 will determine whether an assignment of interest 208 is a terminated assignment. The code 226 will also continue searching for assignments of interest 208 based on the source parameters of any nonterminated assignment of interest.

Some embodiments include a file type recognizer 232 which upon execution will distinguish HTML files from PDF files. File type recognition may be accomplished using file name extensions, file headers, or in appropriate cases a context in which the file type has already been determined.

In some embodiments, a human-readable listing 228 of an identified region 210 of the software program code is present, e.g., on the display 140 or in a hard copy printout, or in alphanumeric form in a file 138. The identified region 210 is defined by the set of assignments of interest and will typically be less than the entire software program code, allowing signature generation to be focused on more relevant portions of code, namely, those more likely to be characteristic of malware.

In some embodiments, a malware detection signature 230 is present. The signature 230 can be generated from a region 210 of the software program code that is defined by the set 206 of assignments of interest and is also less than the entire target software program code.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, the target software may run on multiple virtual machines 134 on devices/systems 102 in a networked cloud to provide state 136 information, whereas abstract syntax data structures 218 may be stored on yet other devices within the cloud. A signature candidate generator 224 that uses the virtual machine states 136 and the abstract syntax data structures 218 to search for assignments of interest 208 may ultimately configure a display 140 on yet another cloud device/system 102, e.g., by displaying a listing 228 of a region 210 that is defined by the assignments of interest 208 located by the signature candidate generator 224.

Processes

Figure 3:
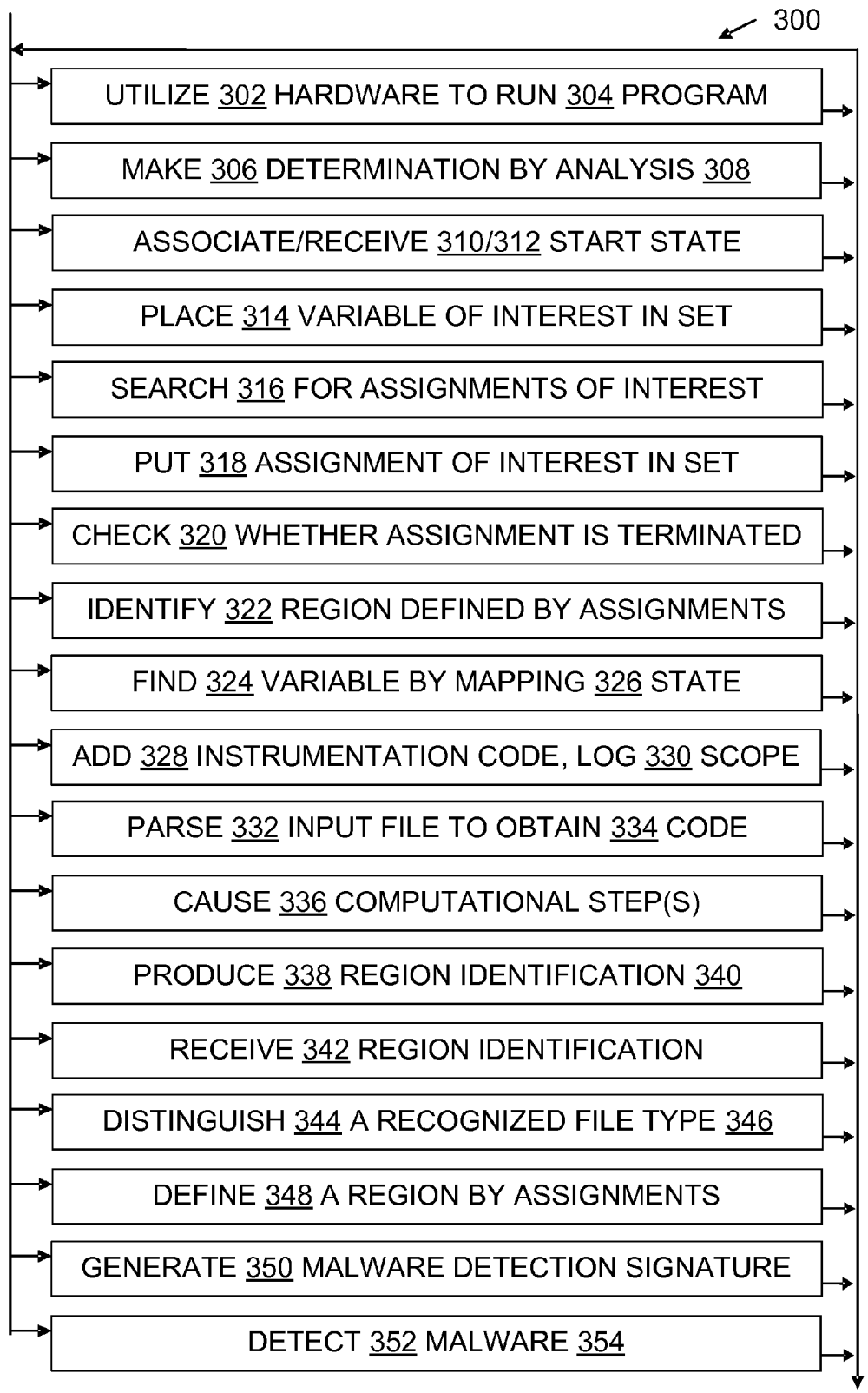
FIG. 3 is a flow chart illustrating steps of some process and configured storage medium embodiments.

FIG. 3 illustrates some process embodiments in a flowchart 300. The technical processes shown in the Figures may be performed in some embodiments automatically, e.g., by a signature candidate generator 224 under control of a command script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide a process for identifying a specific region 210 of a target software program code as a malware detection signature generation candidate, i.e., a candidate for use in generating 350 a malware detection signature 230 usable for detecting 352 malware 354. Use of the term "region" herein permits but does not require that a region consist solely of one contiguous section of code. The region 210 may be a set of contiguous source code statements, for example, or it may include both contiguous and non-contiguous statements, or it may consist entirely of non-contiguous statements. The region may include source code, lower-level code such as bytecode, or both.

In some embodiments, the target software program is configured to run on a virtual machine 134. One embodiment computationally receives 312 an identification start state 212, 136 in a computer memory 112 such as RAM or a hard disk. The start state 212 is a state 136 of the virtual machine 134 while the target program 120 was running, and in particular is a state 136 of the virtual machine 134 for which a determination 214 is made 306 or was made 306 (automatically or manually) that the program code should be investigated as a possible carrier of malware or as some form or component of malware.

This embodiment places 314 in a set 202 of variables of interest in the memory 112 at least one variable 122 which is visible in the identification start state 212, namely, a variable which is within scope in that state and could be assigned a value. The embodiment may find 324 such a visible variable by mapping 326 the identification start state 212 to an abstract syntax data structure 218 that represents the software program code that is being examined for malware. Scopes are logged 330 into the abstract syntax data structure 218 by instrumentation code 222 that was added 328 during compilation of the target software program code. The embodiment searches 316 previously executed states 136 of the virtual machine for any assignment of a variable 204 that belongs to the set of variables of interest, and puts 318 into a set 206 of assignments of interest in the memory 112 any assignment that was found by the searching step 316.

This embodiment checks 320 assignments of interest to see whether they are terminated, that is, to see whether the assigned value is fully determined without recourse to any variables that have not yet been placed in the set 202 of variables of interest. When the set 206 of assignments of interest contains a nonterminated assignment having at least one source parameter variable 216 not found in the set of variables of interest, the embodiment places 314 the source parameter variable(s) of that nonterminated assignment in the set 202 of variables of interest and then repeats the searching 316 and putting 318 steps.

As a result, at some point this embodiment's set 206 of assignments of interest will not contain any nonterminated assignment. When that result occurs, the embodiment identifies 322 as the malware detection signature generation candidate a region 210 of code which is defined by the set 206 of assignments of interest. The defined region 210 may include the set of assignments of interest alone, or it may include the assignments of interest together with at least some of the other program code 120, depending on the user's expressed wishes and/or the particular embodiment's capabilities.

Some embodiments obtain 334 the software program code 120 at least in part by parsing 332 an input file which contains the software program code. In particular, HTML files or PDF files 138 may be parsed 332 to obtain code 120 in some embodiments. The organizational structures of such files 138 and the techniques for locating code within them are familiar to those of skill. Some embodiments use a file recognizer 232 to distinguish 344 one file type 346 from another, e.g., to distinguish HTML from PDF.

Some embodiments make 306 the determination themselves that the program code should be investigated, e.g., by analyzing 308 information which is logged while the program code runs 304. For example, program behavior may be automatically compared to a list of suspicious behaviors, using familiar information and techniques.

From an analyst's perspective, some embodiments help a malware detection/prevention analyst 104 identify software program code for potential use in generating a malware detection signature 230. In one embodiment, the analyst utilizes 302 at least one processor 110 and a computer-readable memory 112 to run 304 the program code 120 on a virtual machine 134 which changes states 136 while the program code is running. In some embodiments, the analyst 104 causes 336 the computational machine (which is not necessarily the same machine the code ran 304 on) to parse 332 an input HTML file or a PDF file to obtain 334 the software program code.

The analyst 104 makes 306 a determination 214, from at least one result which corresponds to at least one state 136 of the virtual machine while running 304 the program code, that the program code should be investigated as a possible carrier of malware. Any familiar tool or criteria for treating software as suspicious can be used to support the determination. An identification start state 212 of the virtual machine is accordingly associated 310 in the memory with the determination 214. The suspicious behavior, for example, will have occurred during the identification start state 212 or during an earlier state of the virtual machine while the target program was running.

A computational machine 102 used by the analyst to obtain candidate code may be the same machine 102 that runs/ran 304 the virtual machine 134, or it may be another machine 102. The analyst 104 causes 336 the computational machine to place 314 in a set of variables of interest 204 in a memory 112 of the computational machine at least one variable which is visible in the identification start state 212, namely, a variable which is within scope and could be assigned a value. The analyst 104 may control the computational machine through a script, a user interface, or another mechanism which causes 336 the machine to execute code that places 314 variables in the set of variables of interest. The analyst 104 likewise causes 336 the computational machine to search 316 previously executed states of the virtual machine (that is, states prior to the identification start state) for any assignment of a variable that belongs to the set of variables of interest 204, and to put 318 into a set of assignments of interest in the memory an assignment that was found by the searching step.

In this embodiment, when the set 206 of assignments of interest contains a nonterminated assignment having at least one source parameter 216 variable 122, the computational machine is caused 336 to place 314 the source parameter variable(s) of that nonterminated assignment in the set of variables of interest and then repeat the searching 316 and putting 318 steps. After the set of assignments of interest does not contain a nonterminated assignment having at least one source parameter variable, the computational machine is caused 336 to produce 338 an identification 340 of a region 210 of target program code 120 as the malware detection signature generation candidate, with the region 210 of code being defined by the set of assignments of interest. The analyst 104 receives 342 the malware detection signature generation candidate identification 340 which was produced by the computational machine, in the form of data displayed on a screen 140 or printed in a file or a hard copy, for example.

In some embodiments, the analyst 104 causes 336 the computational machine to perform the step of finding 324 a variable which is visible in the identification start state based on a mapping 326 between the identification start state and an abstract syntax data structure representation of the software program code. In some, instrumentation code logs 330 scopes in the abstract syntax data structure as code of the target software program is generated during a compilation.

The region of code identified 322 by the computational machine and then received by the analyst can be defined 348 in various ways, depending on analyst commands, machine settings, and the particular capabilities of an embodiment. For example, the identified region 210 may be the set of assignments of interest together with at least code for whatever function each assignment is contained in. Or the region may be the set of assignments of interest together with a specified number of lines of code before (and/or after) the assignment.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a signature candidate generator 224, sets 202, 206 of items of interest, or an identified region 210, in the form of data 118 and instructions 116, read from a removable medium 114 and/or another source such as a network connection, to form a configured medium. The configured medium 112 is capable of causing a computer system to perform technical process steps for transforming data through extraction of a region 210 which has been identified 322 as disclosed herein. FIGS. 1 through 3 thus help illustrate configured storage media embodiments and process embodiments, as well as system and process embodiments. In particular, any of the process steps illustrated in FIG. 3 or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Figure 4:
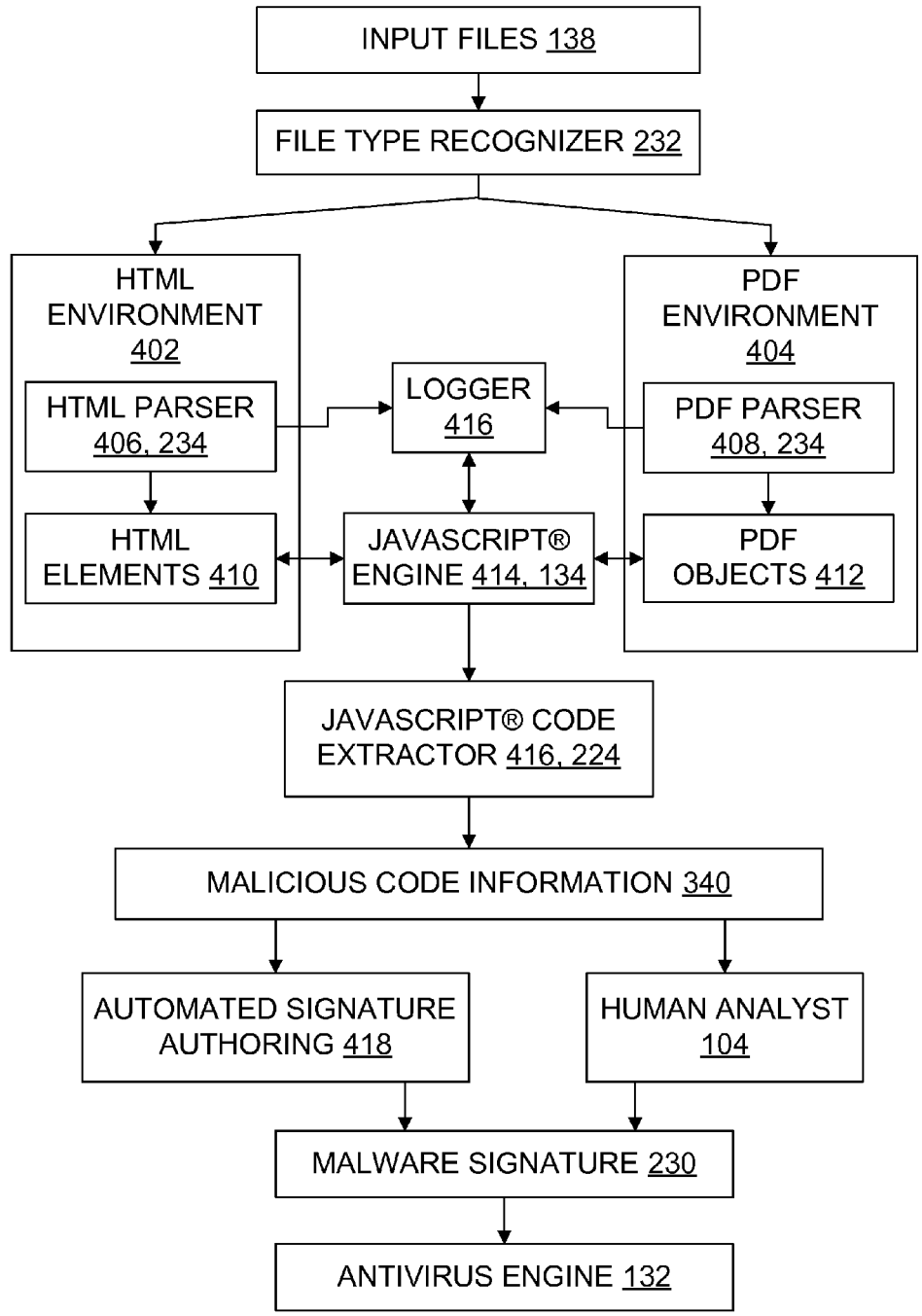
FIG. 4 is a data flow diagram illustrating some embodiments for producing and using malware detection signature candidates from JavaScript® code embedded in HTML or PDF files (JavaScript® is a mark of Oracle America, Inc.).

Some embodiments provide an architectural system like the one shown in FIG. 4, and some embodiments are compatible with (namely, they provide components of) such a system. The illustrated system includes a file type recognizer 232 which dispatches HTML and PDF files 138 to respective execution environments 402, 404. Within each execution environment, a suitably tailored file format parser parses 332 the input file(s) to obtain target code; in the illustrated architecture these include an HTML parser 406 and a PDF parser 408 for their respective file formats. Parsing 332 HMTL files provides HTML elements 410, and parsing PDF files provides PDF objects 412. Parsing can be part of a compilation process which also provides scopes 220 to a logger 416.

In the illustrated system, the HTML elements 410 and PDF objects 412 contain JavaScript® code which is run 304 on a JavaScript® engine 414 (mark of Oracle America, Inc.). Other systems may contain target code in other languages, including in particular but without excluding other possibilities, code which is written in other languages that employ bytecode designed to be run on a virtual machine. The engine 414 includes a virtual machine 134, in a runtime environment which has been built to process the parsing output from arbitrary input files.

From the perspective of malware analysis, the execution environments 402, 404 produce runtime input/output resource behavior and scripted/interactive behaviors for the HTML and PDF files 138. This behavioral output can be logged and/or observed as it occurs. Based on the behavioral information collected, a manual or automatic determination 214 can be made for the input file. For example, a determination can be made 306 that code 120 exploits or targets a specific vulnerability. A determination can also be made 306 on the basis of suspicious behavior, such as heap spray behavior, without identifying a particular vulnerability. In either case, a corresponding code region 210 of statements can be extracted (e.g., identified 322) for automatic processing 418 or manual human use. In the illustrated architecture, a signature candidate generator 224, 416 extracts JavaScript® code but other candidate generators 224 may also identify regions 210 in code that is written in a language other than the JavaScript® language (mark of Oracle America, Inc.).

In the illustrated system, the file type recognizer and dispatcher 232 scans the input files and determines the file type 346 based on the content of the file and also dispatches the file to the corresponding next part of the illustrated proceeding. This stage of preprocessing files can significantly reduce the total processing time and reduce the probability of unexpected errors by excluding unsupported file types.

When the file type is determined, a parsing stage continues processing the input file. Two file format parsers 234 exist in the illustrated system, to parse HTML and PDF files separately. Parsing can facilitate running target code and can also aid in detection of malformed files. Various checkpoints during the parsing process can interact with the logger module 416 to log details of the file structure and content that facilitate malware determination.

The illustrated architecture supports easy configuration of parameters of the file format parser, which benefits handling of malformed files (e.g. files that target a specific browser with a crafted file structure) by adjusting the parsing process for different files. Some implementations focus on extracting and running embedded target code even the embedded script is not runnable by following the language's public specifications, so that the implementation can detect a wider range of potential malicious behaviors. Some architectures can have multiple implementations for given single features that are described by public specifications, to support detection of malware that targets different implementations in different client software, e.g. in a web browser versus a PDF consumer.

In the illustrated architecture, the output of file format parsing includes file type specific objects or elements which are organized in a structure that depends on the file type, e.g., organized as tree or a list. The structure may be part of the runtime environment. The content of the original input file is exposed to the embedded target code as runtime objects, so the target code when interpreted by the engine 414 will interact with these objects.

To facilitate running malicious target code safely and efficiently, in some embodiments the runtime environment has the following characteristics. First, various checkpoints for the interactions between embedded target code and runtime objects interact are monitored by the logger module 416 to log the pertinent details of runtime behavior to promote malware detection. Second, easy configuration of parameters and results of methods/functions of the runtime objects is supported, to allow running malware that targets a different platform or client software version. Third, on-demand simulation of external runtime objects helps support running malware that requires external plugins or objects, such as ActiveX® plugins (mark of Microsoft Corporation).

In the illustrated architecture, the next stage includes making 306 a determination 214 about the input file based on the information logged while parsing and automatically running target code. In some implementations, the determination rules are predefined by analyzing known in the wild malware that exploits various vulnerabilities. The determination 214 can be based on exploits that target specific vulnerabilities, and/or based on suspicious behavior like heap spray.

If a malware determination is made, additional processing can be performed. In some embodiments, this additional processing stage uses a link between the state of the virtual machine 134 (e.g., for an interpreted language, state may include the bytecode and call stack trace) and an output abstract syntax structure 218 from a compiler 128. This link can be implemented by adding a "deep instrumentation" mechanism that logs scopes in the abstract syntax for each bytecode generated to an existing engine 414.

In conjunction with such "deep Instrumentation," the following processes may be done. Starting from the state of virtual machine 134 that triggers the determination 214, extract into a list 202 the variables 122 in all statements (by linking from the virtual machine state to scope in the abstract syntax structure) that trigger the behaviors related to the determination and put those statements in a result list 206. Link all already executed states of the virtual machine (e.g. bytecode) to related scopes 220 in the abstract syntax structure 218. Go through those scopes 220 to look for all the assignments of variables extracted in the previous step, and if an assignment is not terminated (which means it gets values computed from other variables/functions, because if all the source parameters are constant then the assignment is terminated), then add the source variables to a new list (part of set 202), and add the assignment statement to the result list (set 206). Run this step until all assignments are terminated. Dump 338 all the code text that belongs to the statements 208 in the result list and the code region 210 that contains all of these statements 208.

The output identification 340 and/or listing 228 stage can be consumed by an automatic process that authors 418 detection signatures 230 based on the determination and/or consumed by a human analyst 104. By having the output, the automation and the human analyst are able to generate detection signatures focused more closely on the malicious code, instead of using a full file hash as a signature. The generated signature 230 can then be used by an antivirus engine 132 for malware detection.

Some of the discussion herein is derived from "Javascript Sandbox" documentation. Trademarks should be respected. However, "Javascript Sandbox" and its acronym "JS" are used herein to indicate that JavaScript® code is one possibility but is not the only possibility for a language whose code may be run and examined for malware using the sandbox technology described, and therefore "Javascript Sandbox" is not used herein as an Oracle America, Inc. trademark whereas "JavaScript"® is used as a trademark of Oracle America, Inc. For convenience, "Javascript Sandbox" is also denoted "JS" herein. JS includes software implemented by Microsoft Corporation. FIG. 4 illustrates one of the many possible JS architectures.

Aspects of the JS program and/or documentation are consistent with or otherwise illustrate aspects of the embodiments described herein. However, it will be understood that JS documentation and/or implementation choices do not necessarily constrain the scope of such embodiments, and likewise that JS and/or its documentation may well contain features that lie outside the scope of such embodiments. It will also be understood that the discussion is provided in part as an aid to readers who are not necessarily of ordinary skill in the art, and thus may contain and/or omit details whose recitation below is not strictly required to support the present disclosure.

Some malicious pieces of code written in JavaScript® and other bytecode languages use heavy obfuscation (mark of Oracle America, Inc.). It would be helpful to have an efficient way to deobfuscate them. Observing code behaviors can help one quickly determine whether code is malicious or not, and some implementations of JS report vulnerabilities based on behaviors. Heap spray is common in some malware, so finding and dumping the sprayed heap is sometimes helpful in locating shell code (e.g., in a listing 228).

One version of JS includes an HTML5 parser 234, a basic DOM (Document Object Model) implementation 402 for HTML, a PDF parser 234, an XFA (XML Forms Architecture) parser 234, a JScript (Microsoft's ECMAScript implementation) engine 414 and a CSS (Cascading Style Sheets) parser 234 from Microsoft Research. This version also includes helper modules such as a module for heap spray detecting and dumping, a module for vulnerability detections, and a source code beautifier module.

Documentation for one version of JS includes information such as the following (all web addresses are for illustration only and not intended to be live or to incorporate material into this patent disclosure):
Antivirus Pages JavaScript® Sandbox
MS AntiMalware Engine Page
JavaScript® Sandbox (mark of Oracle America, Inc.)
What it is
A project parses HTML and PDF files and builds a runtime environment for running JavaScript® and similar code in a sandbox. It intercepts behaviors, dumps and beautifies code to be run, detects heap spray, and generates exploit detection based on the behaviors.
Where it is
//depot/av/AMResponse/RESTools/rlsbin/utils/Jssb.exe—
   Executable
//depot/av/AMResponse/RESTools/rlsbin/utils/Jssb-
   .Core.dll—Core
//depot/av/AMResponse/RESTools/rlsbin/utils/JssbD-
   B.xml—Exploit detections
//depot/av/AMResponse/RESTools/rlsbin/utils/Microsoft-
   .Contracts.dll—External dependency
How to use
Jssb.exe [/b only beautify JavaScript® code] [/e dump exception info] [/v <PDF version, e.g. 9.1>] [/mt <threads count, max: 32, Experimental>] [/out <result path>] <file or path>+
Parameters:

/b—Output the beautified JavaScript® code only, no sandboxing. Output is as <filename>_formatted.js.
/e—Dump exception information when exception happens. Output is as Jssb_exception_<timestamp>.txt
/v—Specify the PDF reader version to be simulated, as some files check the version to use a different exploit.
/mt—Multi-threads processing, max threads count is 32.
/out—Specify the results output folder, default is current folder.
The results are put under <filename>_result folder as below.
JS_load.<number>.js—JavaScript® code that was loaded to run in sandbox. (The code is beautified, the raw is in result.xml)
JS_eval.<number>.js—JavaScript® code that was loaded through 'eval' to run in sandbox. (The code is beautified, the raw is in result.xml)
PDF_xfa.<number>.js—XFA data that was loaded when PDF opened.
heapspray_buffer.00.bin—Heap dump when heap spray was detected. (Shellcode usually is at end of the dump)
result.xml—Raw dump for the behaviors logged in sandbox.
Detection database is based on the behavior elements.
Exploit detection
Based on the behavior logs in sandbox, possible exploit detections can be reported after the sandboxing. Following are two examples that show detection of C VE-2010-1885 and C VE-2006-0003. Wildcards * and ? are supported.

```
<Detection Name="C VE-2010-1885">
<WebLoadEvent>
<OpenIFrame
Target="hcp://services/search?query=anything&topic=hcp://system/sysinfo/sys infomain.htm%A%%A%%A%%A%*" />
</WebLoadEvent>
</Detection>
<Detection Name="C VE-2006-0003">
<WebPluginEvent>
<C reatePlugin C LSID="*" Name="MDAC " />
</WebPluginEvent>
<WebActiveXEvent>
<C reateObject Name="Shell.Application" />
</WebActiveXEvent>
<WebActiveXEvent>
<Shell.Application.ShellExecute File="*" Arguments="*" Directory="*" Operation="*" Show="*" />
</WebActiveXEvent>
</Detection>
```

In some embodiments, an innovation described herein provides a method for identifying a region of a software program code as a candidate for use in generating a malware detection signature 230. The software program code runs on a virtual machine 134. The software program code is also represented in an abstract syntax data structure.

One method receives an identification start state 212, which is a state of the virtual machine during execution (interpretation is an example of execution) of the program code at which an initial determination was made 306 that the program code should be investigated as a possible carrier of malware. In the identification start state, certain variables are visible, namely, they are within scope and could be assigned a value. This is designated the initial set 202 of variables, which is also the initial content of a set of variables referred to here as the variables of interest 204.

In this embodiment, the initial set of variables of interest is found by mapping 326 the virtual machine state to the abstract syntax data structure. This mapping can be done, for example, by adding instrumentation code 222 which logs scopes in the abstract syntax data structure as executable (or interpretable) code of the software program is generated during compilation.

After the initial set of variables is found, this method uses the mapping from previously executed virtual machine states to abstract syntax data structure scopes as described below. First, the method goes through the previously executed states and looks for assignments of variables that belong to the initial set of variables. This produces an initial set of assignments of interest.

Next, this method checks each assignment of interest 208 to see whether that assignment is terminated. An assignment is said to be terminated if all the values in the expression that is being assigned are constant; otherwise, the assignment is not terminated. Thus, if all source parameters 216 of the expression in the assignment are constant, then the assignment is terminated. But if any source parameter gets a value that is computed from another variable or function, then the assignment is not terminated.

If an assignment 208 is not terminated, then this method adds the assignment's source parameter variable(s) to the set of variables of interest. This method repeats such steps, going through the previously executed states and looking 316 for assignments of variables that belong to the set of variables of interest, producing corresponding assignments of interest, checking 320 to see whether those assignments of interest are terminated, and adding 314 more variables of interest until all assignments in the set of assignments of interest are terminated.

Once all assignments are terminated, this method uses the set of assignments of interest to identify 322 a region of the software program code as a candidate for use in generating a malware detection signature. In one approach, the identified region 210 is the set of assignments of interest, without any surrounding code. In another approach, the identified region 210 is the set of assignments of interest plus some surrounding code. For example, the surrounding code may be (a) each assignment plus the code for whatever function the assignment is contained in, or (b) each assignment plus a specified number of lines of code before and/or after the assignment, or (c) all code from the first assignment of interest encountered up to and including to the last assignment of interest encountered.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable memory configured with data and with instructions that when executed by at least one processor causes the processor(s) to perform a process for identifying software program code as a malware detection signature generation candidate, the software program configured to run on a virtual machine, the process comprising the computational steps of:

receiving an identification start state in the memory, the start state being a state of the virtual machine while the program was running, and in particular being a state of the virtual machine for which a determination is made that the program code should be investigated as a possible carrier of malware;

placing in a set of variables of interest in the memory at least one variable which is visible in the identification start state, namely, a variable which is within scope and could be assigned a value;

searching previously executed states of the virtual machine for any assignment of a variable that belongs to the set of variables of interest;

putting into a set of assignments of interest in the memory an assignment that was found by the searching step;

when the set of assignments of interest contains a nonterminated assignment having at least one source parameter variable, placing the source parameter variable(s) of that nonterminated assignment in the set of variables of interest and then repeating the searching and putting steps;

when the set of assignments of interest does not contain a nonterminated assignment having at least one source parameter variable, identifying as the malware detection signature generation candidate a region of code which is defined by the set of assignments of interest.

2. The configured memory of claim 1, wherein the method further comprises the step of finding a variable which is visible in the identification start state, and the finding step comprises mapping the identification start state to an abstract syntax data structure representation of the software program code.

3. The configured memory of claim 1, wherein the method further comprises the step of adding instrumentation code which logs scopes in an abstract syntax data structure as code of the software program is generated during a compilation.

4. The configured memory of claim 1, wherein the method identifies a region of code which is defined by the set of assignments of interest in that the identified region is the set of assignments of interest together with at least some of the other program code.

5. The configured memory of claim 1, wherein the method identifies a region of code which is defined by the set of assignments of interest in that the identified region is the set of assignments of interest, without any other program code.

6. The configured memory of claim 1, wherein the method further comprises obtaining the software program code at least in part by parsing an input file which contains the software program code.

7. The configured memory of claim 1, wherein the method further comprises the step of making the determination that the program code should be investigated, and the determination making step comprises analyzing information which is logged while the program code runs.

8. A process for use by an analyst assisted by a computational machine to identify software program code as a malware detection signature generation candidate, the software program configured to run on a virtual machine, the process comprising the steps of:

utilizing at least one processor and a memory to run the program code on the virtual machine, the virtual machine changing states while the program code is running;

making a determination, from at least one result which corresponds to at least one state of the virtual machine while running the program code, that the program code should be investigated as a possible carrier of malware;

associating an identification start state in memory with the determination;

causing the computational machine to place in a set of variables of interest in a memory of the computational machine at least one variable which is visible in the identification start state, namely, a variable which is within scope and could be assigned a value;

the computational machine also being caused to search previously executed states of the virtual machine (states prior to the identification start state) for any assignment of a variable that belongs to the set of variables of interest;

the computational machine also being caused to put into a set of assignments of interest in the memory an assignment that was found by the searching step;

when the set of assignments of interest contains a nonterminated assignment having at least one source parameter variable, the computational machine also being caused to place the source parameter variable(s) of that nonterminated assignment in the set of variables of interest and then repeat the searching and putting steps;

when the set of assignments of interest does not contain a nonterminated assignment having at least one source parameter variable, the computational machine also being caused to produce an identification of a region of code as the malware detection signature generation candidate, the region of code defined by the set of assignments of interest; and receiving the malware detection signature generation candidate identification which was produced by the computational machine.

9. The process of claim 8, wherein the method further comprises the step of causing the computational machine to perform the step of finding a variable which is visible in the identification start state, and the finding step comprises mapping the identification start state to an abstract syntax data structure representation of the software program code.

10. The process of claim 8, wherein the method further comprises causing an addition of instrumentation code which logs scopes in an abstract syntax data structure as code of the software program is generated during a compilation.

11. The process of claim 8, wherein the region of code received during the receiving step is the set of assignments of interest together with at least code for whatever function each assignment is contained in.

12. The process of claim 8, wherein the region of code received during the receiving step is the set of assignments of interest together with a specified number of lines of code before the assignment.

13. The process of claim 8, wherein the method further comprises causing the computational machine to parse at least one of the following: an input HTML file which contains the software program code, an input PDF file which contains the software program code.

14. A computer system comprising:
a logical processor;
a memory in operable communication with the logical processor;
an abstract syntax data structure representation of a software program code residing in the memory;
a start state of a virtual machine residing in the memory, the start state being a state of the virtual machine during a run of the software program code on the virtual machine, and in particular being a state of the virtual machine for which a determination is made that the software program code should be investigated as a possible carrier of malware;
a set of one or more variables of interest residing in the memory and including at least one variable which is visible in the start state, namely, a variable which is within scope in the start state and could be assigned a value;
a set of previously executed states of the virtual machine; and
a signature candidate generator including code which upon execution by the logical processor will utilize the abstract syntax data structure representation and the virtual machine start state to identify a set of assignments of interest at least in part by searching previously executed states of the virtual machine for any assignment of a variable that belongs to the set of variables of interest and putting in the set of assignments of interest at least one assignment in the software program code that is visible to at least one variable of the start state, and wherein the set of assignments of interest includes said assignment on the basis of said visibility in that without said visibility said assignment would not be included in the set of assignments of interest, and when the set of assignments of interest contains a nonterminated assignment having at least one source parameter variable, placing the source parameter variable(s) of that nonterminated assignment in the set of variables of interest and then repeating the searching, and when the set of assignments of interest does not contain a nonterminated assignment having at least one source parameter variable, identifying as a malware detection signature generation candidate a region of code which is defined by the set of assignments of interest.

15. The system of claim 14, wherein the system further comprises parser code which upon execution by the logical processor will parse at least one of the following: an input HTML file which contains the software program code, an input PDF file which contains the software program code.

16. The system of claim 14, wherein the signature candidate generator includes code which upon execution by the logical processor will determine whether an assignment of interest is a terminated assignment.

17. The system of claim 14, wherein the system further comprises a file type recognizer which upon execution will distinguish HTML files from PDF files.

18. The system of claim 14, wherein the software program code comprises bytecode.

19. The system of claim 14, wherein the system further comprises a human-readable listing of an identified region of the software program code, the identified region being defined by the set of assignments of interest and being less than the entire software program code.

20. The system of claim 14, wherein the system further comprises a malware detection signature which has been generated from a region of the software program code that is defined by the set of assignments of interest and is also less than the entire software program code.

* * * * *